(12) United States Patent
Goetz et al.

(10) Patent No.: US 9,964,155 B2
(45) Date of Patent: May 8, 2018

(54) ARRANGEMENT COMPRISING A HOLLOW SHAFT, AN INPUT SHAFT AND A CLAMPING DEVICE

(71) Applicant: Lenze Drives GmbH, Extertal (DE)

(72) Inventors: Tino Goetz, Wennigsen (DE); Ralf Guhl, Aerzen (DE)

(73) Assignee: Lenze Drives GmbH, Extertal (DE)

( * ) Notice: Subject to any disclaimer, the term of this patent is extended or adjusted under 35 U.S.C. 154(b) by 0 days. days.

(21) Appl. No.: 14/889,508

(22) PCT Filed: May 8, 2014

(86) PCT No.: PCT/EP2014/059481
§ 371 (c)(1),
(2) Date: Nov. 6, 2015

(87) PCT Pub. No.: WO2014/180963
PCT Pub. Date: Nov. 13, 2014

(65) Prior Publication Data
US 2016/0102713 A1     Apr. 14, 2016

(30) Foreign Application Priority Data

May 8, 2013 (DE) .......... 10 2013 208 568

(51) Int. Cl.
*F16D 1/06* (2006.01)
*F16D 1/095* (2006.01)
*F16D 1/08* (2006.01)

(52) U.S. Cl.
CPC ......... *F16D 1/0817* (2013.01); *F16D 1/0847* (2013.01); *F16D 1/0858* (2013.01); *F16D 1/095* (2013.01)

(58) Field of Classification Search
None
See application file for complete search history.

(56) References Cited

U.S. PATENT DOCUMENTS 1,355,028 A  *  10/1920  Blessing ............... B25B 27/023
                                                           29/263
2,397,382 A  *  3/1946  Smith ....................... F16D 1/02
                                                           279/102
(Continued)

FOREIGN PATENT DOCUMENTS

AT           171892 B       7/1952
CN        202091387 U      12/2011
(Continued)

OTHER PUBLICATIONS

International Search Report (PCT/ISA/210) issued in counterpart International Application No. PCT/EP2014/059481 dated Sep. 23, 2014, with English translation (Five (5) pages).

*Primary Examiner* — Joshua J Michener
*Assistant Examiner* — Kyle J. Walraed-Sullivan
(74) *Attorney, Agent, or Firm* — Crowell & Moring LLP

(57) ABSTRACT

In the case of an arrangement with a hollow shaft, an input shaft partially contained in the hollow shaft, and a clamping device, the hollow shaft is connected to the input shaft by forces which are directed radially to the hollow shaft being introduced into the hollow shaft at at least three discrete introduction points arranged along a circumference of the hollow shaft.

11 Claims, 2 Drawing Sheets

(56) References Cited

U.S. PATENT DOCUMENTS

| | | | | |
|---|---|---|---|---|
| 3,751,941 | A * | 8/1973 | Stiff | F16D 7/02 192/82 T |
| 3,936,926 | A * | 2/1976 | Hornschuch | B23P 11/02 29/525 |
| 3,998,563 | A | 12/1976 | Kloeren | |
| 4,826,347 | A * | 5/1989 | Baril | B21D 39/06 403/282 |
| 4,848,953 | A * | 7/1989 | Young | B25B 5/147 403/290 |
| 5,011,306 | A * | 4/1991 | Martinie | F16C 35/073 384/272 |
| 5,048,998 | A * | 9/1991 | Viets | F16D 1/0817 403/351 |
| 5,145,277 | A * | 9/1992 | Fujita | F16D 1/095 301/111.01 |
| 5,153,990 | A * | 10/1992 | Martinie | F16C 35/073 29/450 |
| 5,211,211 | A * | 5/1993 | Rubino | B25B 27/02 29/259 |
| D358,075 | S * | 5/1995 | Ulmer | D8/51 |
| D359,670 | S * | 6/1995 | Cutter | D8/51 |
| 5,427,468 | A * | 6/1995 | Muellenberg | F16D 1/04 403/350 |
| 5,496,124 | A * | 3/1996 | Bareis | F16C 3/28 403/15 |
| 5,496,127 | A | 3/1996 | Mueller et al. | |
| 5,845,384 | A * | 12/1998 | Retzbach | B23P 11/022 29/252 |
| 6,053,508 | A * | 4/2000 | Kuhl | B23B 31/117 279/102 |
| 7,470,080 | B2 | 12/2008 | Zimmermann et al. | |
| 8,961,025 | B1 * | 2/2015 | Kobayashi | F16C 35/063 384/538 |
| 2001/0006314 | A1 * | 7/2001 | Braun | F16D 1/0858 310/91 |
| 2004/0003807 | A1 * | 1/2004 | Hamilton | B23D 61/10 125/13.01 |
| 2004/0037638 | A1 * | 2/2004 | Zimmerman | F16D 1/095 403/374.3 |
| 2005/0287006 | A1 | 12/2005 | Roso et al. | |
| 2006/0083637 | A1 * | 4/2006 | Marielle | F01C 17/06 417/410.3 |
| 2008/0025791 | A1 * | 1/2008 | Godde | F16D 1/095 403/404 |
| 2010/0111594 | A1 * | 5/2010 | Wright | F16D 1/0858 403/300 |
| 2010/0129222 | A1 * | 5/2010 | Hidding | F16D 1/033 416/170 R |
| 2011/0138604 | A1 * | 6/2011 | Zimmermann | B23K 26/0081 29/446 |
| 2011/0306438 | A1 * | 12/2011 | Moore | A63B 53/007 473/296 |
| 2012/0076575 | A1 * | 3/2012 | Smith | B23P 11/00 403/289 |
| 2012/0141200 | A1 * | 6/2012 | Kaura | F16D 1/095 403/373 |
| 2012/0301216 | A1 * | 11/2012 | Mahn | F16D 1/095 403/227 |
| 2016/0097420 | A1 * | 4/2016 | Grimmer | F16C 1/02 464/97 |
| 2016/0177991 | A1 * | 6/2016 | Daniels | F16B 7/1427 403/109.1 |

FOREIGN PATENT DOCUMENTS

| | | |
|---|---|---|
| DE | 74 23 987 U | 1/1976 |
| DE | 42 30 941 A1 | 3/1994 |
| DE | 100 60 037 C1 | 1/2002 |
| DE | 10 2005 039 174 A1 | 2/2007 |
| EP | 0 889 255 A1 | 1/1999 |
| EP | 1 650 403 A1 | 4/2006 |
| FR | 2 393 189 A1 | 12/1978 |
| GB | 1046938 A | 10/1966 |
| GB | 1 601 159 A | 10/1981 |

* cited by examiner

ARRANGEMENT COMPRISING A HOLLOW SHAFT, AN INPUT SHAFT AND A CLAMPING DEVICE

This application is a national stage application of PCT International Application No. PCT/EP2014/059481, filed May 8, 2014, which claims priority under 35 U.S.C. § 119 from German Patent Application No. 10 2013 208 568.0, filed May 8, 2013, the entire disclosures of which are herein expressly incorporated by reference.

BACKGROUND AND SUMMARY OF THE INVENTION

The invention relates to an arrangement comprising a hollow shaft, an input or drive shaft partially contained in the hollow shaft, and a clamping device. The clamping device has a loose state in which the hollow shaft and the input shaft are removable from each other, and a fixed state in which the hollow shaft is connected to the input shaft.

Arrangements of the type in question are used, for example, in order to connect an output side of a gearing to an input shaft. Typically here, the hollow shaft is connected to the gearing such that a torque can be transmitted between the gearing and the hollow shaft. The input shaft is typically designed as a solid shaft.

The clamping device serves for frictionally connecting the hollow shaft to the input shaft such that a torque can also be transmitted between the hollow shaft and the input shaft. For the installation, the clamping device has a loose state in which the input shaft and the hollow shaft are not yet fixed relative to each other, and therefore the input shaft can be inserted into the hollow shaft. Subsequently, the clamping device is typically transferred into the fixed state, and therefore the hollow shaft is frictionally connected to the input shaft. The two shafts are therefore fixed with respect to each other.

A known arrangement is shown, for example, in DE 742 39 87 U. The hollow shaft here is clamped onto the input shaft by means of a press ring, wherein the diameter of the hollow shaft is uniformly tapered over the circumference thereof. The hollow shaft is also pressed tangentially here.

A further embodiment is shown in DE 42 30 941 A1, wherein it is proposed to provide the hollow shaft with an internal cone on both sides and to compensate for a tolerance between hollow shaft and input shaft via an additional conical and slotted adaptor piece. In this case, an axial offset may occur between the shafts during the transition of the clamping device into the fixed state.

A further embodiment is shown in DE 100 600 37 C1 in which it is proposed to provide the hollow shaft on two sides with an internal cone and to compensate for a possible tolerance between the shafts via an additional conical and slotted adaptor piece. For this purpose, however, an increased number of elements and space during the installation are required.

The invention is based on the object of providing an arrangement in which tolerances of a largest possible size between input shaft and hollow shaft can be compensated for, wherein this is preferably intended to take place as simply as possible and with as little space as possible being required.

The invention achieves the object by an arrangement according to embodiments of the invention.

The invention relates to an arrangement comprising a hollow shaft, an input shaft or drive haft partially contained in the hollow shaft, and comprising a clamping device. The clamping device has a loose state in which the hollow shaft and the input shaft are removable from each other. The clamping device furthermore has a fixed state in which the hollow shaft is connected to the input shaft.

According to the invention, during the transition from the loose into the fixed state, the clamping device introduces forces which are directed radially to the hollow shaft into the hollow shaft at at least three discrete introduction points arranged along a circumference of the hollow shaft such that the hollow shaft bends in the direction of the input shaft at the introduction points and bends away from the input shaft between the introduction points.

The effect which is therefore achieved is that the hollow shaft is no longer subjected tangentially to a compressive stress, but rather predominantly to a bending stress. This permits a significantly more extensive deformability of the hollow shaft, for which less force is also required than in the case of an embodiment according to the prior art in which the hollow shaft is subjected tangentially to a compressive stress. At the same time, self centering is achieved. There is also no necessity to provide slots for bridging high fitting tolerances. Forces are directly transmitted without an additional adaptor piece, with torsional strength and torsional rigidity being maintained.

The introduction points are those points along the circumference of the hollow shaft at which the hollow shaft absorbs forces directed radially to the hollow shaft and accordingly bends toward the input shaft. Said forces are preferably distributed uniformly over the circumference of the hollow shaft. Furthermore preferably, precisely three introduction points are involved here, as a result of which a secure connection is made possible between the shafts and at the same time respective circumferential portions, which are available for the bending, between the introduction points are as long as possible.

The hollow shaft bends away from the input shaft between the introduction points such that the radial distance in respective regions between the introduction points is larger than the radial distance between the hollow shaft and the input shaft in the loose state of the clamping device. Said regions run along the circumference of the hollow shaft and do not take up the entire circumferential portion between two circumferentially adjacent introduction points because the hollow shaft bears against the input shaft adjacent to the introduction points.

The arrangement according to the invention can be provided or designed, for example, for connecting the hollow shaft of a gearing to the input shaft or output shaft of a system/machine.

The hollow shaft is designed in particular to guide the force, which is introduced radially by means of the clamping device, by a purely radial flow of force, i.e. in particular free from tangential and/or axial force components, through the hollow shaft directly radially into a radially aligned clamping point between hollow shaft and input shaft. In other words, the radial force introduced by the clamping device is passed on radially by the hollow shaft and acts radially or normally on the input shaft, i.e. introduction of force preferably does not bring about any tangential and/or axial forces in the hollow shaft. The introduction points preferably lie directly over the clamping point, i.e. are precisely fixed geometrically.

The force results from the elastic deformation brought about by means of the clamping device, wherein the elastic energy stored in the hollow shaft opposes the clamping forces, for which reason the hollow shaft is of deformable design. So that the hollow shaft does not obstruct said clamping operation, the hollow shaft is preferably designed to be deformable polygonally.

The clamping device is not involved in the transmission of the shaft torque itself.

A material thickness of the hollow shaft can vary over the circumference of the hollow shaft, i.e. an external contour of the hollow shaft can differ from an internal contour of the hollow shaft. The material thickness of the hollow shaft can vary over the circumference in such a manner that the material thickness has a respective local maximum at the at least three introduction points.

In a corresponding manner, a material thickness of an adaptor sleeve can vary over the circumference of the adaptor sleeve, i.e. an external contour of the adaptor sleeve can differ from an internal contour of the adaptor sleeve. The material thickness of the adaptor sleeve can vary over the circumference in such a manner that the material thickness has a respective local maximum at the at least three introduction points.

A plurality of possible embodiments of the arrangement according to the invention and, where applicable, respective variants of said embodiments are described below.

According to a first embodiment, the clamping device is designed as a clamping ring which has a conical bore. Furthermore, the clamping device is arranged in an axially displaceable manner relative to the hollow shaft such that, during the transition from the loose into the fixed state, said clamping device presses the hollow shaft radially inward by means of the conical bore at the introduction points.

This embodiment permits the necessary forces, which are directed radially to the hollow shaft, to be produced at the introduction points by means of an axial movement of the clamping ring. Such an axial displacement can be achieved, for example, by axially arranged screws. It is therefore possible to produce considerably higher forces on the hollow shaft using relatively little effort for rotating a screw.

The clamping ring is preferably designed as a closed clamping ring. This increases the stability of the clamping ring. Such an embodiment as a closed clamping ring is possible because, in the embodiment according to the invention, the clamping ring does not have to change its circumference.

According to a first variant of the first embodiment, the hollow shaft has an external profile which, at the introduction points, has a respective radially outwardly directed elevation which is of conical design in the axial direction. Said elevations define the position of the introduction points. The formation of such elevations on the hollow shaft permits the introduction points to be defined by the shaping of the hollow shaft.

The elevations can be of polygonal design, which can mean, for example, that said elevations have, a cross section which is rectangular or trapezoidal. It should be mentioned that, in the case of such a rectangular or trapezoidal shape or also in the case of another polygonal shape or other shape, one side of the respective elevation merges into the encircling clamping ring which is circular in cross section. Alternatively to an elevation of polygonal design, the elevation can also be designed, for example, in such a manner that an external diameter of the hollow shaft is increased continuously toward a respective introduction point, and therefore the respective elevation does not have any recognizable edges.

According to a second variant of the first embodiment, an encircling adaptor piece is arranged between the clamping device and the hollow shaft, which adaptor piece has a thickness profile designed in such a manner that, at least in the fixed state of the clamping device, said adaptor piece transmits a radial force between the clamping device and the hollow shaft at the introduction points. This makes it possible to define the positions of the introduction points by means of the adaptor piece. The thickness profile can be designed, for example, in such a manner that the adaptor piece has a number of projections on the outside, as has been described with respect to the first variant. To this extent, reference is made here to these embodiments.

According to a third variant of the first embodiment, the hollow shaft has a respective external key slot at each introduction point, wherein a plurality of keys is provided between the clamping device and the hollow shaft. Each key is contained here in a respectively assigned key slot and, at least in the fixed state of the clamping device, transmits a radial force between the clamping device and the hollow shaft at the introduction points.

This embodiment with keys makes it possible, for example, to provide different keys for different installation purposes, for example keys made of different material or with a different shaping. The keys here can preferably be of conical or wedge-shaped design. In addition, they can be exchanged after a certain operating period of the arrangement in order to avoid a deterioration in the strength of the connection between the hollow shaft and the input shaft or in order to restore the original quality of the connection after a determined deterioration in said connection.

In the case of all three variants of the first embodiment, forces directed radially to the hollow shaft are produced at the introduction points by means of the conical bore of the clamping ring by the clamping ring being displaced axially in such a manner that the conical bore tapering at a certain axial position comes into engagement with another element, for example an elevation or a key, and presses said element radially in the direction of the hollow shaft.

An external profile which contains said elements is preferably of conical design here. This permits a particularly good fit between the conical bore of the clamping ring and the conically designed external profile of the hollow shaft, of the adaptor piece or of the keys. Furthermore preferably, a slope of the cone of the external profile corresponds to a slope of the cone of the clamping ring.

Hollow shafts or adaptor pieces for the first embodiment, as described, can be obtained for example, by out-of-round turning. A surface of a round workpiece can therefore be structured along the circumference in a known manner.

According to a second embodiment, the hollow shaft has an external profile which, at the introduction points, has a respective radially outwardly directed elevation. The clamping device here is designed as a clamping ring which is rotatable concentrically relative to the hollow shaft and has a plurality of internal depressions in each case assigned to an elevation of the hollow shaft. The depressions have a respective surface profile which is variable along a circumference of the clamping ring such that the respectively assigned elevation is pressed radially inward when the clamping ring is rotated in one direction and is released when the clamping ring is rotated in the opposite direction.

With such an embodiment, instead of the axial displacement of the clamping ring described in the first embodiment, the transition between loose and fixed state of the clamping ring is achieved by rotation of the clamping ring. A space requirement necessary fir the axial displacement and for the actuation of a mechanism for the axial displacement, for example a screw, in the axial direction is therefore superfluous. In other words, in the second embodiment, the clamping ring can be transferred from the loose into the fixed state and vice versa without additional space for this purpose being necessary in the axial direction. This can facilitate the fitting under confined space conditions.

With regard to the elevations mentioned within the scope of the second embodiment, reference should be made to the embodiments of the elevations in the first embodiment that apply analogously here. The elevations in the case of the second embodiment are preferably designed in such a manner that they can be easily pressed radially inward by the depressions when the clamping ring is rotated in a corresponding direction. For this purpose, said elevations can be, for example, of polygonal, in particular rectangular design in cross section, or alternatively can also be of bent design in an appropriate shape.

According to a third embodiment, the clamping device has a plurality of radially adjustable jaws, wherein one jaw in each case is assigned to an introduction point for introducing a force, which is directed radially to the hollow shaft, into the hollow shaft. In the preferred embodiment with three such jaws, a conventional three-jaw chuck can be used. This permits the use of a known device with which, as is known, high radical forces can be produced.

According to a fourth embodiment, the clamping device is designed as a clamping ring with a plurality of radially adjustable screws, wherein one screw in each case is assigned to an introduction point for introducing a force, which is directed radially to the hollow shaft, into the hollow shaft. The screws here are preferably arranged in such a manner that they extend radially with the longitudinal direction thereof transversely with respect to the outer surface of the hollow shaft. In this fourth embodiment, the required forces can be exerted at the introduction points by screwing in the screws. This makes it possible to produce the threes by rotating screws, which makes high forces possible with comparatively little effort.

In the fourth embodiment, there is preferably a number of webs for fixing the clamping ring on the hollow shaft. Said webs are preferably formed in an encircling intermediate space between the hollow shaft and the clamping ring. They can protrude, for example, from the hollow shaft or from the clamping ring. Alternatively, they can be pushed as independent components between the hollow shaft and the clamping ring. The effect can therefore be achieved that, during the installation operation, before the screws are screwed in and tightened, the clamping ring remains concentric with the hollow shaft without said clamping ring having to be held in such a position manually or by aids. This facilitates the installation and ensures that, by uniformly tightening the screws, uniform forces can be produced at the respective introduction points. Respective webs are preferably formed here at or directly adjacent to the introduction points.

According to a first variant of a fifth embodiment, the clamping device has the following: an externally double-conical, internally cylindrical internal ring, an external ring which is arranged at a distance in the radial direction with respect thereto and is of closed and internally double-conical design, and double-conical pressure rings which are inserted on both sides between internal ring and external ring and are clampable against the internal ring and external ring via screws, wherein at least one of the pressure rings has a plurality of projections assigned in each case to an introduction point. As an alternative thereto, in a second variant of the fifth embodiment, the internal ring can also be designed in such a manner that it exerts a radially inwardly directed force on the hollow shaft merely at the introduction points.

In the fifth embodiment, by means of the special design of the clamping device, a particularly uniform effect of the respective forces is achieved in the axial direction via a respective section.

The arrangement can be configured in such a manner that that part of the hollow shaft which bends away from the input shaft between the introduction points is supported on the clamping device.

In all of the embodiments described, with the exception of the first variant of the first embodiment, the hollow shaft preferably has a cylindrical external profile. An as uniform as possible effect of the forces axially is therefore achieved. The designation "cylindrical" is not inevitably understood here as meaning that the respective external profile is completely unstructured, i.e. corresponds in the mathematical sense to the external profile of a cylinder. On the contrary, this designation is understood here as meaning that the respective external profile is not conical, i.e. has a cross section which is non-variable at least in sections in the axial direction. However, it may nevertheless be structured along the circumference, for example by the provision of elevations, keys, grooves or the like.

BRIEF DESCRIPTION OF THE DRAWINGS

Further embodiments and advantages of the invention will be gathered by a person skilled in the art from the exemplary embodiments described below with respect to the attached drawing, in which.

DETAILED DESCRIPTION OF THE EXEMPLARY EMBODIMENTS

Figure 1A:
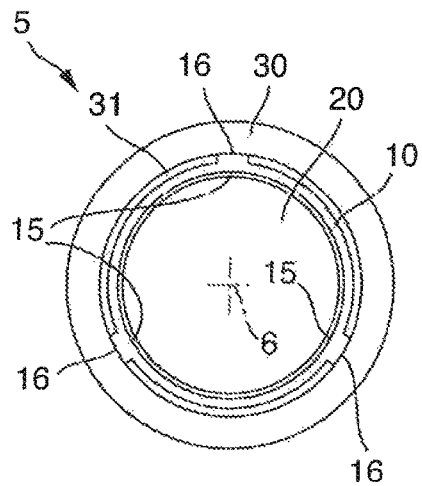
FIGS. 1A to 1C show a first exemplary embodiment, specifically an arrangement according to the first variant of the first embodiment.
Figure 1B:
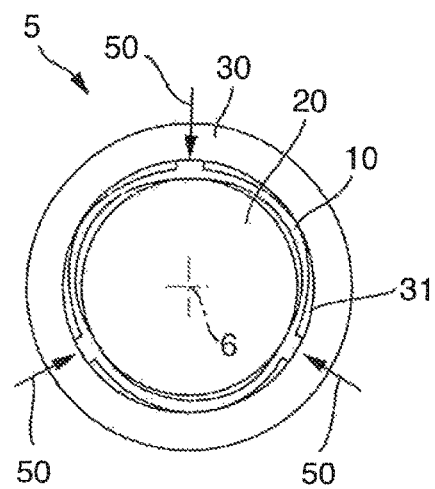
Figure 1C:
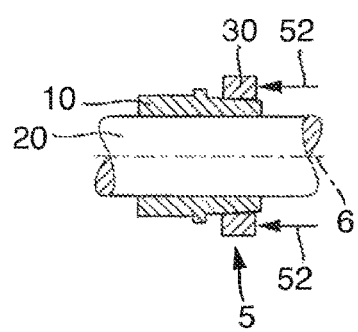

FIGS. 1A to 1C show a first exemplary embodiment of an arrangement 5 which is designed according to the first variant of the first embodiment. The arrangement 5 has a hollow shaft 10, an input shaft 20 and a clamping device which, in the present case, is designed as a clamping ring 30. The input shaft 20 is contained in the hollow shaft 10. The hollow shaft 10, the input shaft 20 and the clamping ring 30 are arranged concentrically with respect to one another with a common axis 6, wherein the clamping ring 30 is arranged on the outside, the input shaft 20 is arranged on the inside and the hollow shaft 10 is arranged between the input shaft 20 and the clamping ring 30.

FIGS. 1A and 1B show cross-sectional views. FIG. 1A here shows a situation in which the clamping ring 30 is in the loose state thereof. FIG. 1B shows a situation in which the clamping ring 30 is in the fixed state thereof.

The hollow shaft 10 has a total of three introduction points 15 at which, in the fixed state of the clamping ring 30, the hollow shaft 10 is intended to be bent radially toward the input shaft 20. In order to achieve this, respective elevations 16 which, in the present case, have a rectangular cross section are formed at the respective introduction points 15. In order to be able to exert the corresponding forces during the transition from the loose to the fixed state, the hollow shaft 10 has an external profile which is conical in the axial direction, and the clamping ring 30 has a conical bore 31 which is formed in an opposed manner with respect thereto and in which the hollow shaft 10 is accommodated. The effect which can therefore be achieved by axially displacing the clamping ring 30 relative to the hollow shaft 10 is that edges of the conical bore 31 press onto the respective projections 16 and therefore exert forces 50 directed radially onto the hollow shaft. This is illustrated in FIG. 1B.

During the transition to the fixed state of the clamping ring 30, as illustrated in FIG. 1B, forces 50 directed radially onto the hollow shaft 10 are exerted at the introduction points 15 by the clamping ring 30. The hollow shaft 10 is therefore bent toward the input shaft 20 at the introduction points 15. By contrast, the hollow shaft 10 is bent away from the input shaft 20 between the introduction points 15 such that the hollow shaft 10 and the input shaft 20 are only still in contact with each other in the vicinity of the introduction points 15. However, this suffices in order to fix the two shafts 10, 20 relative to each other and to transmit a rotational movement or a torque from one shaft to the other.

As can be seen in FIG. 1B, during the transition from the loose into the fixed state of the clamping ring 30, the hollow shaft 10 is not subjected to a compressive stress, but rather predominantly to a bending stress. The hollow shaft 10 here is substantially more flexible than when subjected to a compressive stress. This makes it possible to bridge relatively large tolerances in the radii of the hollow shaft 10, on the one hand, and of the input shaft 20, on the other hand. At the same time, a reduction in the required forces is therefore achieved since a tangential pressing of the hollow shaft 10 is no longer required. This constitutes a considerable advantage of the arrangement according to the invention since such a tangential pressing is required in embodiments according to the prior art and requires a very high degree of effort.

FIG. 1C shows the arrangement 5 of FIGS. 1A and 1B in a lateral sectional view. It can be seen here that the hollow shaft 10 and the clamping ring 30 have opposed conical external and internal surfaces. The state of FIG. 1C corresponds here to that of FIG. 1B, i.e. the clamping ring 30 is in the fixed state thereof.

FIG. 1C shows threes 52 which act axially, i.e. parallel to the axis 6, in order to transfer the clamping ring 30 from the loose into the fixed state thereof and to hold same therein. Said forces can be produced, for example, by means of suitably arranged screws which lie parallel to the axis 6 and permit a lateral displacement of the clamping ring 30 relative to the hollow shaft 10.

Figure 2A:
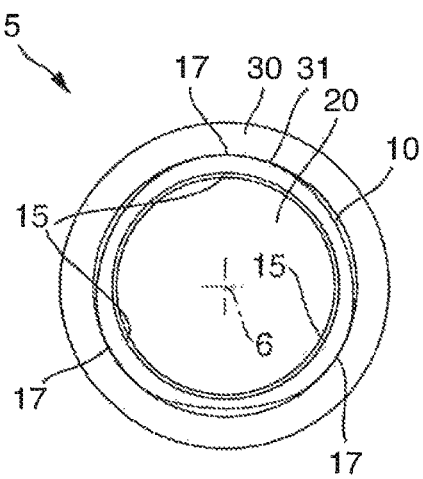
FIGS. 2A to 2B show a second exemplary embodiment, specifically an alternative arrangement according to the first variant of the first embodiment.
Figure 2B:
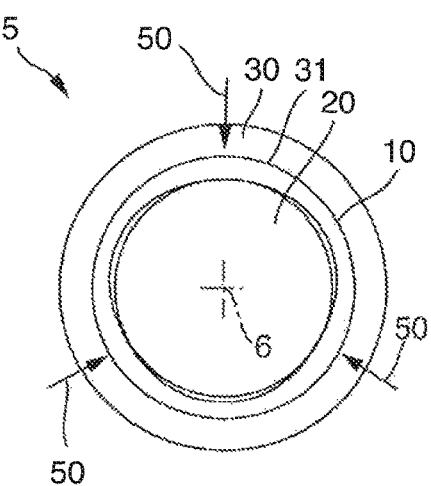

FIGS. 2A and 2B show a second exemplary embodiment of an arrangement 5 which is likewise designed according to the first variant of the first embodiment. However, in comparison to the first exemplary embodiment, the second exemplary embodiment is somewhat modified. Only the differences will be discussed below. FIG. 2A in turn shows a situation in which the clamping ring 30 is in the loose state thereof, and FIG. 2B shows a situation in which the clamping ring 30 is in the fixed state thereof.

In contrast to the first exemplary embodiment, in the second exemplary embodiment of FIGS. 2A and 2B the hollow shaft 10 has elevations 17 which are not of rectangular design, but rather are of hill-shaped designed. In other words, sharp edges are dispensed with in the case of the elevations 17, and therefore the elevations 17 are designed as regions of continuously rising and filling external surfaces of the hollow shaft 10. The external surface of the hollow shaft 10 of the arrangement 5 according to the second exemplary embodiment is of conical design in the axial direction, as also in the first exemplary embodiment, and therefore a transition from the loose into the fixed state of the clamping ring 30 likewise takes place as in the embodiment of FIGS. 1A to 1C. The installation under certain conditions can be facilitated by dispensing with sharp edges.

Figure 3:
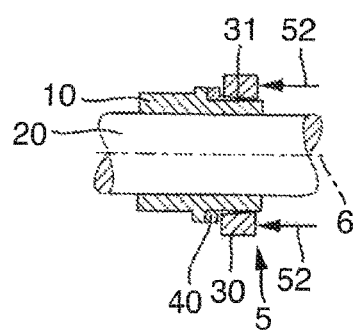
FIG. 3 shows a third exemplary embodiment, specifically an arrangement according to the second variant of the first embodiment.

FIG. 3 shows a third exemplary embodiment of an arrangement 5 which is designed according to the second variant of the first embodiment, wherein the clamping ring 30 is in the fixed state. An adaptor piece 40 which has a conical external surface designed in an opposed manner to the conical bore 31 is located between the clamping ring 30 and the hollow shaft 10. Furthermore, in the same manner as the external surface of the hollow shaft 10 in FIG. 1A, the external surface is provided with respective elevations which cannot be seen in the illustration of FIG. 3 since a lateral sectional view is involved here. The transition from the loose into the fixed state and the manner of fastening the hollow shaft 10 on the input shaft 20 take place in the same manner as in the first exemplary embodiment. In contrast thereto, only the adaptor piece 40 is located between the hollow shaft 10 and the clamping ring 30.

Figure 4:
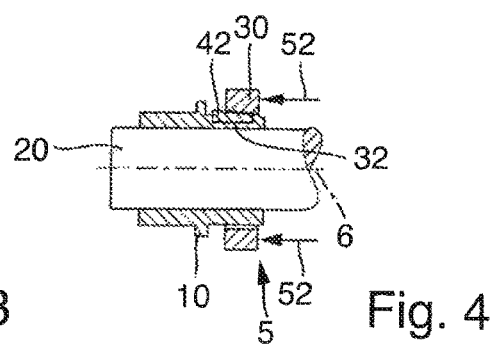
FIG. 4 shows a fourth exemplary embodiment, specifically an arrangement according to the third variant of the first embodiment.

FIG. 4 shows a fourth exemplary embodiment of an arrangement 5 which is designed according to the third variant of the first embodiment, wherein, in a modification to the third exemplary embodiment, instead of the adaptor piece 40 at the respective introduction points 15, respective keys 42 are provided, of which only one key 42 is shown in the illustration of FIG. 4. The keys 42 are accommodated in respective key slots 32 of the hollow shaft 30 and have a conical external surface which is formed in an opposed manner to the conical bore 31 of the clamping ring 30. The transition from the loose into the fixed state can therefore take place in the same manner as has been described in detail with respect to the first exemplary embodiment. The only difference here is that, instead of the elevations 16 which are formed directly in the hollow shaft 10, the respective keys 42 are pressed radially in the direction of the hollow shaft by the clamping ring 30 and thereby exert the required forces 50. This also takes place by axial displacement of the clamping ring 30 by means of axial forces 52 suitable for this purpose.

It should be noted that, in the case of the third and fourth exemplary embodiments according to FIGS. 3 and 4, the hollow shaft 30 has a cylindrical external surface, which is not of disadvantage since the adaptor piece 40 or the keys 42 are of conical design and therefore form a counterpart to the conical bore 31 of the clamping ring 30. By contrast, in the first and second exemplary embodiments according to FIGS. 1A to 1C and 2A and 2B, the external surface of the hollow shaft 30 itself is of correspondingly conical design. The embodiments according to the third and fourth exemplary embodiments can therefore preferably be used if a hollow shaft 10 with a cylindrical external surface is already present.

Figure 5A:
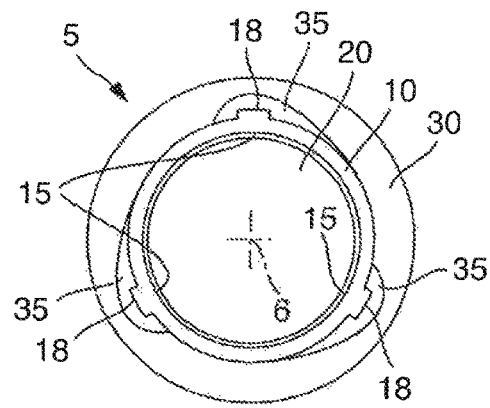
FIGS. 5A to 5B show a fifth exemplary embodiment, specifically an arrangement according to the second embodiment.
Figure 5B:
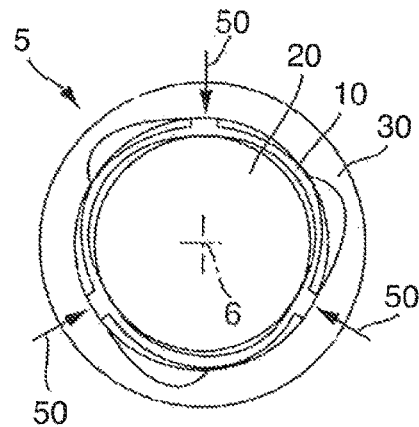

FIGS. 5A and 5B shows a fifth exemplary embodiment of an arrangement 5 which is designed according to the second embodiment. A hollow shaft 10 is also surrounded here by a clamping device in the form of a clamping ring 30 and is intended to be mounted onto an input shaft 20 which is contained in the hollow shaft 10. For this purpose, three introduction points 15 are likewise provided, at which forces 50 directed radially to the hollow shaft 10 are intended to be introduced into the hollow shaft 10 so that the hollow shaft 10 bends toward the input shaft 20 at the introduction points 15 and bends away from the input shaft 20 between the introduction points 15.

FIG. 5A shows a situation in which the clamping ring 30 is in the loose state thereof. In contrast to the previously described clamping ring, the clamping ring 30 according to the fifth exemplary embodiment does not have a conical bore, but on the contrary has three internal depressions 35. The depressions 35 are in each case assigned to an elevation 18 of the hollow shaft 10, wherein the elevations 18 of the hollow shaft 10 are designed in the same manner as the elevations 16, which have already been described with respect to the first exemplary embodiment.

In order to transfer the clamping ring 30 from the loose state thereof shown in FIG. 5A into the fixed state thereof, which is shown in FIG. 5B, the clamping ring 30 is rotated. In the process, respective internal surfaces of the depressions 35 come into engagement with the elevations 18 and, owing to the internal surface of the respective depression 35 tapering during the rotation, press the elevations 18 radially inward. In other words, the effect achieved by the rotation of the clamping ring 30 is that threes 50 directed radially to the hollow shaft 30 are produced at the introduction points 15. Thus, the effect is also achieved as in the previously described embodiments that the hollow shaft 10 is bent toward the input shaft 20 at the introduction points 15 while said hollow shaft is bent away from the input shaft 20 between the introduction points 15. Also in this case, a secure connection between the hollow shaft 10 and the input shaft 20 is therefore achieved by subjecting the hollow shaft 10 to a bending stress, which affords the advantages already described.

Figure 6:
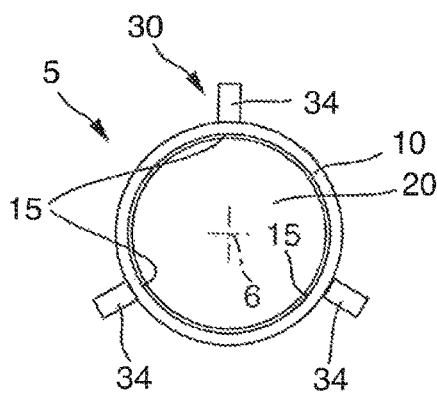
FIG. 6 shows a sixth exemplary embodiment, specifically an arrangement according to the third embodiment.

FIG. 6 shows a sixth exemplary embodiment of an arrangement 5 which is designed according to the third embodiment. The clamping device 30 here is designed in the form of a three-jaw chuck which has three jaws 34. In the situation shown in FIG. 6, the clamping device 30 is in the loose state thereof. The three jaws 34 bear here against the hollow shaft 10 and can be moved in a known manner radially toward the hollow shaft 10 in order to exert forces directed radially onto the hollow shaft at the three introduction points 15. The hollow shaft 10 can therefore be bent inward at the introduction points 15 in the same manner as has already been described with respect to the previous figures, wherein the effect is achieved at the same time that the hollow shaft 10 is bent away from the input shaft 20 between the introduction points 15.

The sixth exemplary embodiment, which is shown in FIG. 6, permits the use of a known three-jaw chuck for connecting a hollow shaft 10 to an input shaft 20.

Figure 7:
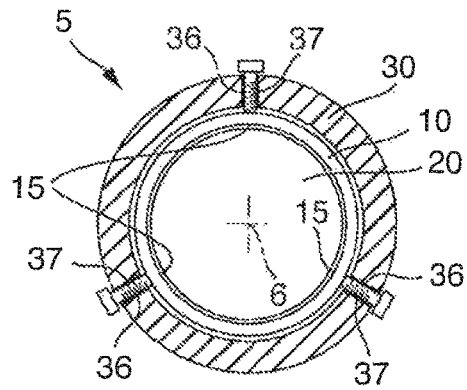
FIG. 7 shows a seventh exemplary embodiment, specifically an arrangement according to the fourth embodiment.

FIG. 7 shows a seventh exemplary embodiment of an arrangement 5 which is designed according to the fourth embodiment. The clamping device here is designed as a clamping ring 30 which has three bores 36. The bores 36 are oriented radially. A respective screw 37 which is likewise oriented radially because of the arrangement of the respective bores 36 is guided through the bores 36. By rotation of the screws 37, which have an external thread in a known manner, the screws 37 can be moved toward the hollow shaft 10. In this manner, respective forces can be exerted on the hollow shaft 10 at the respective introduction points 15, to which a respective screw 37 is assigned, said forces acting radially on the hollow shaft 10 and bending the hollow shaft 10 toward the input shaft 20. Between the introduction points 15, the hollow shaft 10 bends away here from the input shaft 20, as has likewise already been described with respect to the previous figures. By screwing in the screws 37, the clamping device can therefore be transferred from the loose state illustrated in FIG. 7 into a fixed state.

The embodiments shown make it possible for a hollow shaft to be simply and rapidly installed on an input shaft, wherein the hollow shaft is not subjected to a compressive stress, but rather to a bending stress, and therefore the bridging of relatively large differences between the internal radius of the hollow shaft and the external radius of the input shaft is also possible using comparatively little effort. An arrangement according to the invention is therefore significantly set apart from the prior art.

The invention claimed is:

1. An arrangement comprising:
   a hollow shaft;
   an input shaft partially contained in the hollow shaft; and
   a clamping device, wherein the clamping device has an unfixed state in which the hollow shaft and the input shaft are removable from each other, and a fixed state in which the hollow shaft is connected to the input shaft,
   wherein
      during a transition from the unfixed state into the fixed state, the clamping device introduces radially-inward forces onto the hollow shaft at at least three discrete introduction points arranged along an outer circumference of the hollow shaft such that the hollow shaft bends radially inward and is in contact with the input shaft at the introduction points, bends radially outward away from the input shaft between the introduction points, and remains in contact with the input shaft at the introduction points when in the fixed state.

2. The arrangement as claimed in claim 1, wherein the introduction points are distributed uniformly over the circumference of the hollow shaft.

3. The arrangement as claimed in claim 1, wherein
   the clamping device is designed as a clamping ring which has a conical bore, and
   the clamping device is arranged in an axially displaceable manner relative to the hollow shaft such that, during the transition from the unfixed state into the fixed state, said clamping device presses the hollow shaft radially inward by way of the conical bore at the introduction points.

4. The arrangement as claimed in claim 3, wherein the clamping ring is designed as a closed clamping ring.

5. The arrangement as claimed in claim 3, wherein an encircling adaptor piece is arranged between the clamping device and the hollow shaft, which adaptor piece has a thickness profile designed such that, at least in the fixed state of the clamping device, said adaptor piece transmits a radial force between the clamping device and the hollow shaft at the introduction points.

6. The arrangement as claimed in claim 5, wherein the hollow shaft has a cylindrical external profile.

7. The arrangement as claimed in claim 1, wherein that part of the hollow shaft which bends away from the input shaft between the introduction points is supported on the clamping device after overcoming the distance between clamping device and hollow shaft.

8. The arrangement as claimed in claim 2, wherein
- the clamping device is designed as a clamping ring which has a conical bore, and
- the clamping device is arranged in an axially displaceable manner relative to the hollow shaft such that, during the transition from the loose state into the fixed state, said clamping device presses the hollow shaft radially inward by way of the conical bore at the introduction points.

9. The arrangement as claimed in claim 4, wherein the hollow shaft has an external profile which, at the introduction points, has a respective radially outwardly directed elevation which is of conical design in the axial direction.

10. The arrangement as claimed in claim 4, wherein an encircling adaptor piece is arranged between the clamping device and the hollow shaft, which adaptor piece has a thickness profile designed such that, at least in the fixed state of the clamping device, said adaptor piece transmits a radial force between the clamping device and the hollow shaft at the introduction points.

11. The arrangement as claimed in claim 2, wherein that part of the hollow shaft which bends away from the input shaft between the introduction points is supported on the clamping device after overcoming the distance between clamping device and hollow shaft.

\* \* \* \* \*